(12) United States Patent
Iwakoshi

(10) Patent No.: US 9,418,025 B2
(45) Date of Patent: Aug. 16, 2016

(54) INFORMATION PROCESSING DEVICE, INFORMATION PROCESSING METHOD, AND CONTROL SYSTEM

(71) Applicant: Masaki Iwakoshi, Nagakute (JP)

(72) Inventor: Masaki Iwakoshi, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 392 days.

(21) Appl. No.: 14/048,698

(22) Filed: Oct. 8, 2013

(65) Prior Publication Data

US 2014/0122815 A1 May 1, 2014

(30) Foreign Application Priority Data

Nov. 1, 2012 (JP) ................................. 2012-241871

(51) Int. Cl.
  *G06F 3/06* (2006.01)
  *G06F 13/16* (2006.01)
  *G06F 3/00* (2006.01)

(52) U.S. Cl.
  CPC .................................. *G06F 13/1626* (2013.01)

(58) Field of Classification Search
  None
  See application file for complete search history.

(56) References Cited

U.S. PATENT DOCUMENTS

2005/0237814 A1* 10/2005 Li ..................... G11C 11/5628
                                                            365/185.28
2006/0193182 A1   8/2006 Shiga

FOREIGN PATENT DOCUMENTS

| JP | A-2003-337760 | 11/2003 |
| JP | A-2004-152194 | 5/2004 |
| JP | A-2006-236056 | 9/2006 |
| JP | A-2012-58840 | 3/2012 |

\* cited by examiner

*Primary Examiner* — Scott Sun
(74) *Attorney, Agent, or Firm* — Oliff PLC

(57) ABSTRACT

An information processing device includes a storage device that stores information, and a controller that adjusts a consumption of read time of reading information to be read per unit data amount according to the priority of the information to be read from the storage device and a permitted read time during which read of information from the storage device is permitted. The permitted read time varies according to the processing time of another control different from the control of the read.

17 Claims, 8 Drawing Sheets

| READ METHOD | THREE MAJORITY RULE (3) | MIRRORING (2) | SUM CHECK (1) | NO DATA ASSURANCE (0) |
|---|---|---|---|---|
| ACQUIRED DATA ITEM | A = A ≠ B | A ≠ B | A & TOTAL VALUE ≠ TOTAL VALUE | B |
| ADOPTED DATA ITEM | A | NONE (FAIL-SAFE VALUE) | NONE (FAIL-SAFE VALUE) | B |
| SAFETY | HIGH ←——————————————————————→ LOW |||| 
| ACCESS TIME | LONG ←——————————————————————→ SHORT ||||

FIG. 3

| DATA ITEM | PRIORITY | READ METHOD | |
|---|---|---|---|
| | | PATTERN 1 | PATTERN 2 |
| A | HIGH | THREE MAJORITY RULE | THREE MAJORITY RULE |
| B | MEDIUM | THREE MAJORITY RULE | SUM CHECK |
| C | LOW | MIRRORING | SUM CHECK |
| D | NO | SUM CHECK | SUM CHECK |

FIG.4
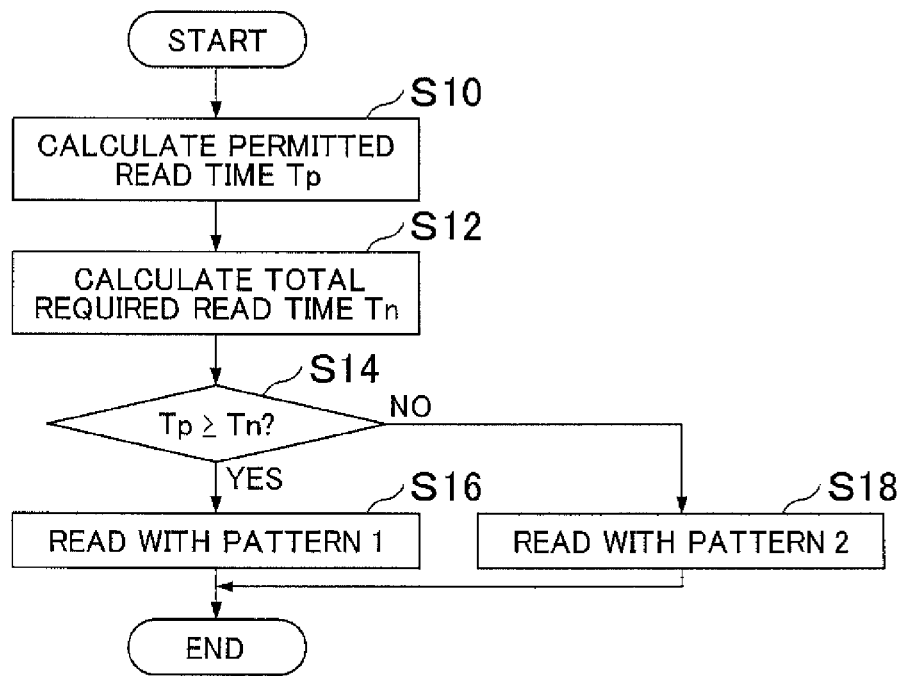
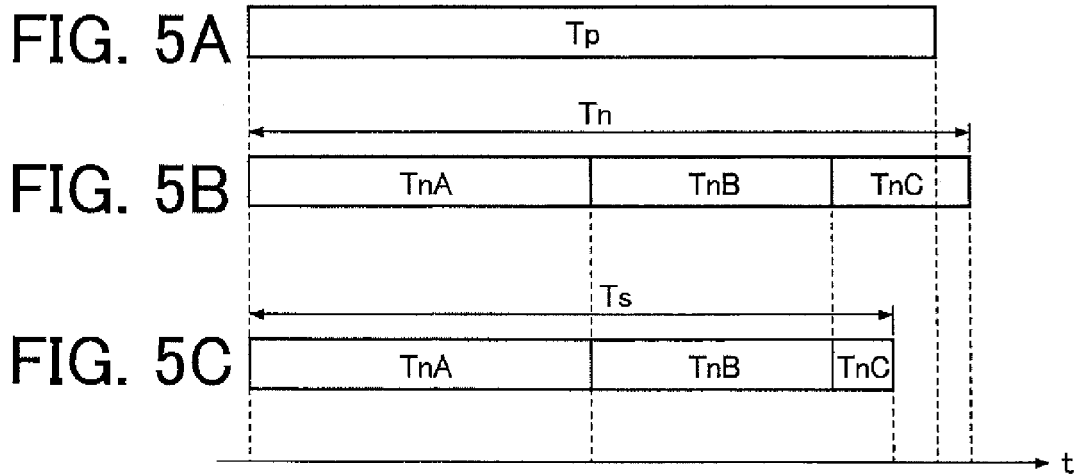

INFORMATION PROCESSING DEVICE, INFORMATION PROCESSING METHOD, AND CONTROL SYSTEM

INCORPORATION BY REFERENCE

The disclosure of Japanese Patent Application No. 2012-241871 filed on Nov. 1, 2012 including the specification, drawings and abstract is incorporated herein by reference in its entirety.

BACKGROUND OF THE INVENTION

1. Field of the Invention

The invention relates to an information processing device, an information processing method, and a control system that read information from a storage device.

2. Description of Related Art

Japanese Patent Application Publication No. 2006-236056 (JP-2006-236056 A) discloses a memory control device that allocates a permitted read time when read of first data from a memory is permitted to a predetermined period, executes the read of the first data from the memory within the permitted read time, and executes read of second data from the memory within the remaining time of the predetermined period to which the permitted read time is not allocated.

However, in JP-2006-236056 A, since the second data is read within the remaining time of the predetermined period, when the remaining time is extremely short, there is a possibility that it is not possible to secure a time required to read the second data.

SUMMARY OF THE INVENTION

The invention provides an information processing device, an information processing method, and a control system that read information to be read from a storage device within a limited time.

An information processing device according to a first aspect of the invention includes a storage device that stores information, and a controller that adjusts a consumption of read time of reading information to be read per unit data amount according to a priority of the information to be read from the storage device and a permitted read time during which read of information from the storage device is permitted. The permitted read time varies.

A control system according to a second aspect of the invention includes the information processing device according to the first aspect, a detection device that detects a predetermined physical quantity, and a control device that operates according to the physical quantity detected by the detection device. The storage device stores a correction value used for correction of the physical quantity detected by the detection device.

An information processing device according to a third aspect of the invention includes a storage device that stores information, and a controller that is configured to read information to be read using a read method corresponding to a priority such that all of the information to be read from the storage device is read within a permitted read time during which read of information from the storage device is permitted. The permitted read time varies.

A control system according to a fourth aspect of the invention includes the information processing device according to the third aspect, a detection device that detects a predetermined physical quantity, and a control device that operates according to the physical quantity detected by the detection device. The storage device stores a correction value used for correction of the physical quantity detected by the detection device.

An information processing method according to a fifth aspect of the invention is an information processing method executed by an information processing device. The method calculates a permitted read time during which read of information from a storage device is permitted, and adjusts a consumption of read time of reading information to be read per unit data amount according to a priority of the information to be read from the storage device and the permitted read time.

According to the first to fifth aspects described above, it is possible to read the information to be read from the storage device within the limited time.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a list showing common read methods;

FIG. 3 is a table showing an example of the correspondence between the priority of data to be read and the read method in the embodiment of the invention;

FIG. 4 is a flowchart showing an example of an information processing method executed according to the correspondence of FIG. 3;

FIGS. 5A to 5C are views for explaining the adjustment of a read time in the embodiment of the invention;

DETAILED DESCRIPTION OF EMBODIMENTS

Hereinbelow, an embodiment of the invention will be described with reference to the drawings.

Figure 1:
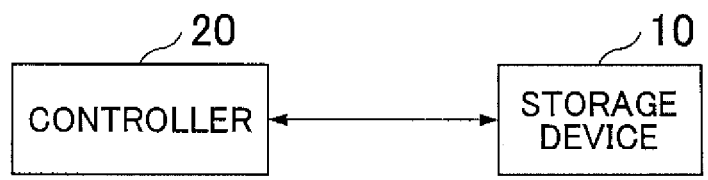
FIG. 1 is a block diagram showing an example of an information processing device as an embodiment of the invention.

As shown in FIG. 1, an information processing device 1 includes a storage device 10, and a controller 20.

In the information processing device 1, a permitted read time which is a time during which read of information from the storage device 10 is permitted varies. The permitted read time varies at any time according to, e.g., the processing time of another control different from the read of the information from the storage device 10.

The storage device 10 stores predetermined information. A specific example of the storage device 10 includes a semiconductor memory, but the storage device 10 may be a storage device other than the semiconductor memory. A specific example of the semiconductor memory includes an electrically erasable programmable read only memory (EEPROM). In addition, the storage device 10 may also be a nonvolatile memory other than the EEPROM (e.g., a magnetoresistive random access memory (MRAM) and ferroelectric random access memory (FeRAM)), or may be a volatile memory such as a random access memory (RAM) or the like.

The controller 20 adjusts a consumption of read time of reading information to be read from the storage device 10 per unit data amount according to the priority of the information to be read from the storage device 10 and the permitted read time. A specific example of the controller 20 includes a microcomputer provided with a central processing unit (CPU). The consumption of read time of reading the information to be read from the storage device 10 per unit data amount is a time consumed to read the information to be read from the storage device 10 per unit data amount. The unit is, e.g., "second/bit".

Hereinafter, the information to be read from the storage device 10 is referred to as "read-required information Ds", the permitted read time is referred to as a "permitted read time Tp", the consumption of read time of reading the information to be read from the storage device 10 per unit data amount is referred to as a "unit consumed read time Tu", and a time consumed to read all of the information to be read from the storage device 10 is referred to as a "total consumed read time Ts". In addition, the priority of the read-required information Ds may be appropriately determined according to, e.g., the importance of the read-required information Ds.

According to the information processing device 1 described above, the total consumed read time Ts can be dynamically adjusted by dynamically adjusting the unit consumed read time Tu. Therefore, even when the data amount of the read-required information Ds has a different value every time the read from the storage device 10 is performed, it is possible to reliably read the read-required information Ds within the permitted read time Tp. Particularly, the priority assigned to each read-required information Ds can be reflected in the adjustment of the unit consumed read time Tu, and hence it is possible to read the read-required information Ds by using the unit consumed read time Tu suitable for the priority within the permitted read time Tp. The controller 20 may adjust the unit consumed read time Tu according to the priority of the read-required information Ds such that all of the read-required information Ds can be read within the permitted read time Tp.

In addition, the controller 20 may read the read-required information Ds using the read method corresponding to its priority such that all of the read-required information Ds can be read within the permitted read time Tp. According to the information processing device 1 described above, it is possible to reliably read the read-required information Ds using the read method suitable for its priority within the permitted read time Tp.

FIG. 2 is a list showing the type of the common read method. In general, when information (data) is read from the memory, data assurance such as three majority rule, mirroring, or sum check is performed.

The three majority rule is a read method in which, for example, three identical data items are pre-stored in the memory and, in a case where one different data item is present among three data items read from the memory, the other two data items are determined to be correct data items and are adopted. The mirroring is a read method in which, for example, two identical data items are pre-stored in the memory and, in a case where two data items read from the memory are identical with each other, the read data item is adopted and, in a case where two data items read from the memory are not identical with each other, a fail-safe value prepared in advance is adopted. The sum check is a read method in which, for example, the total value of least significant bit values of data stored in the memory is pre-stored in the memory and, in a case where the total value of the least significant bit values of data after being read from the memory coincides with the total value pre-stored in the memory, the read data is adopted and, in a case where the total value thereof does not coincide with the total value pre-stored in the memory, the fail-safe value prepared in advance is adopted.

The data assurance described above is performed as a countermeasure against the garbling of data (garbled data). However, the read method having higher safety of the data assurance tends to have a longer access time to the memory.

In the case of the read methods shown in FIG. 2, the safety of the data assurance is higher in the order of the three majority rule, the mirroring, and the sum check, and the a time required to read data from the memory is longer in this order as well. Consequently, when all of the read-required information Ds is to be read using the read method having high safety of the data assurance though the permitted read time Tp is short, there is a possibility that the read of all of the read-required information Ds is not completed within the permitted read time Tp.

The controller 20 reads the read-required information Ds from the storage device 10 using the read method predetermined according to the priority of the read-required information Ds and the length of the permitted read time Tp. For example, the read method of the read-required information Ds may be appropriately changed according to the length of the permitted read time Tp. As a specific example, in a case where the length of the permitted read time Tp is short, the read-required information Ds may be read using the read method having the required read time shorter than that of the read method used when the permitted read time Tp is long. That is, since the read method is determined according to the priority of the read-required information Ds and the length of the permitted read time Tp, it is possible to adjust the unit consumed read time Tu for each read-required information Ds. With this, it is possible to adjust the unit consumed read time Tu for each read-required information Ds such that the total consumed read time Ts falls within the permitted read time Tp.

FIG. 3 is a table showing an example of the correspondence between the priority of the read-required information Ds (four data items A, B, C, and D) and the read method. Pattern 1 indicates the read method in a case where the permitted read time Tp is long, while Pattern 2 indicates the read method in a case where the permitted read time Tp is short.

FIG. 4 is a flowchart showing an example of an information processing method executed by the information processing device 1 according to the correspondence of FIG. 3.

In step S10, the controller 20 calculates the permitted read time Tp. In the next step S12, the controller 20 calculates a total required read time Tn required to read all of the read-required information Ds from the storage device 10. Herein, at least one of the permitted read time Tp and the total required read time Tn may be calculated by another calculation device other than the controller 20, and the controller 20 may acquire the time calculated by the calculation device. In addition, the order of execution of step S10 and step S12 may be reversed.

The controller 20 compares the total required read time Tn with the permitted read time Tp (step S14) and, in a case where the permitted read time Tp is not less than the total required read time Tn, the controller 20 determines that the permitted read time Tp is sufficient, and executes the processing in step S16. In step S16, the controller 20 reads the read-required information Ds using the read method of Pattern 1 of FIG. 3. With this, the controller 20 adjusts the unit consumed read time Tu and the total consumed read time Ts.

On the other hand, in a case where the permitted read time Tp is less than the total required read time Tn, it is not possible to read all of the read-required information Ds using the read method of Pattern 1 of FIG. 3 within the permitted read time Tp. In step S14, in the case where the permitted read time Tp is less than the total required read time Tn, the controller 20 executes the processing in step S18. In step S18, the controller 20 reads the read-required information Ds using the read method of Pattern 2 of FIG. 3 that has the shorter required read time. With this, the controller 20 adjusts the unit consumed read time Tu and the total consumed read time Ts.

By the execution of the above control by the controller 20, it is possible to change the read method of the read-required information Ds to the read method that allows the read of all of the read-required information Ds within the permitted read time Tp according to the length of the permitted read time Tp. As a result, it is possible to secure the read time and the safety of the data assurance with an adequate balance.

FIGS. 5A to 5C are views for explaining an example of the method for adjusting the unit consumed read time Tu and the total consumed read time Ts. Information items A, B, and C are assumed to be the read-required information Ds. The required read time required to read the information item A is assumed to be TnA, the required read time required to read the information item B is assumed to be TnB, and the required read time required to read the information item C is assumed to be TnC. The total required read time Tn is represented by the sum of TnA, TnB, and TnC.

As shown in FIG. 5B, in a case where the information items A, B, and C are read when the total required read time Tn is more than the permitted read time Tp, the time actually consumed to read the information items A, B, and C exceeds the permitted read time Tp. To cope with this, as shown in FIG. 5C, the controller 20 can reduce the unit consumed read time Tu of the information item C by reducing the read time consumed to read the information item C by changing the read method, and can cause the total consumed read time Ts consumed to read the information items A, B, and C to fall within the permitted read time Tp.

Examples of the case where the total required read time Tn exceeds the permitted read time Tp includes a case where the total data amount of the information to be read from the storage device 10 is increased and/or a case where the permitted read time Tp is reduced. An increase or decrease in the total data amount of the information to be read from the storage device 10 or an increase or decrease in the permitted read time Tp dynamically changes according to, e.g., the control state of the controller 20.

In the case of FIG. 5C, although the read time consumed to read the information item C is reduced by reducing the unit consumed read time Tu of the information item C, the read time consumed to read the information item A or B may be reduced by reducing the unit consumed read time Tu of the other information item A or B other than the information item C. In addition, the total consumed read time Ts may be less than or equal to the permitted read time Tp.

Since the total consumed read time Ts can be adjusted by adjusting the unit consumed read time Tu of the read-required information Ds, it is possible to read all of the read-required information Ds within the permitted read time Tp.

The read time consumed to read the read-required information Ds corresponds to the time from the start of the read of the read-required information Ds to the completion of the read. For example, the read time corresponds to the time from when the storage device 10 having received a read command from the controller 20 starts the output of the information in response to the read command to when the output thereof is completed.

Herein, the controller 20 may appropriately reduce the unit consumed read time Tu of the information item lower in priority than the other information items of the read-required information Ds. In FIG. 5C, if it is assumed that the priority is higher in the order of the information times A, B, and C, the unit consumed read time Tu of the information item C having the lowest priority is reduced. With this, as compared with a case where the unit consumed read time Tu of the information item A or B having the higher priority is reduced, even when an error occurs as the result of use of the information read after the reduction in unit consumed read time Tu, its influence can be minimized. For example, by reading the information item C having the lower priority using the read method having the required read time shorter than that of the read method used when the information item A or B having the higher priority is read, the unit consumed read time Tu of the information item C having the lower priority may be reduced.

Figure 6:
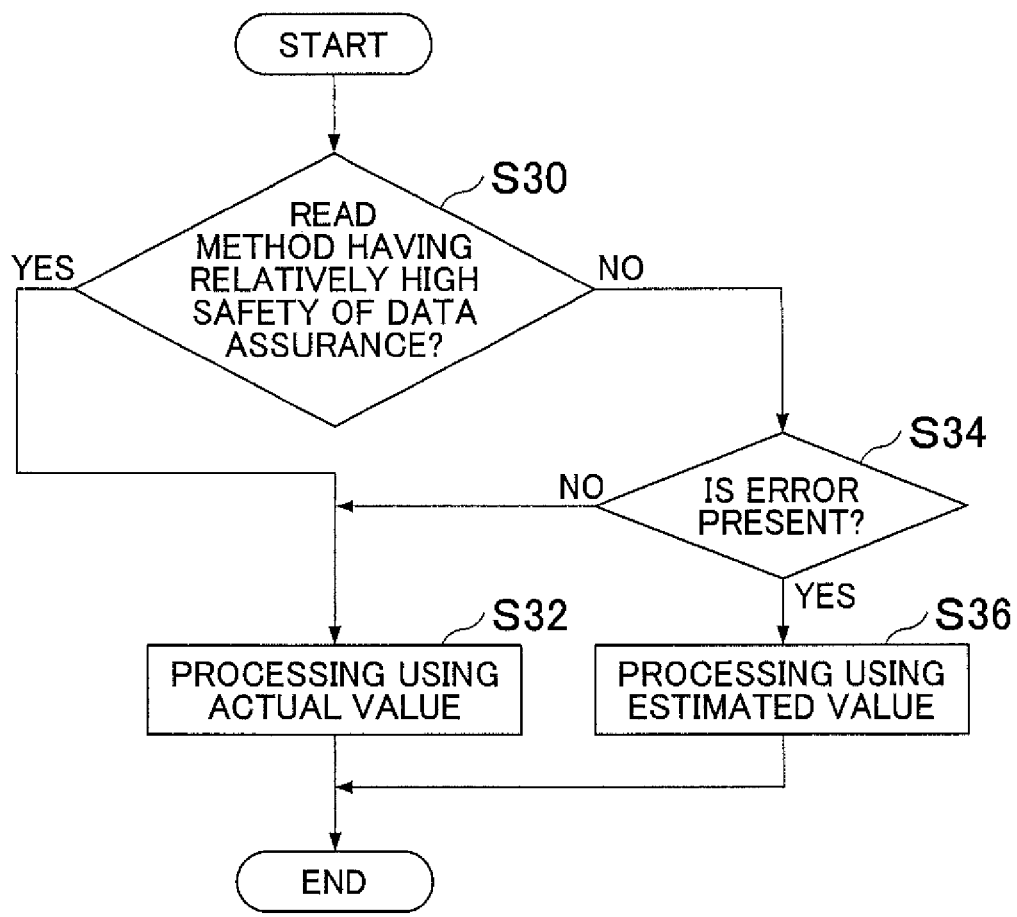
FIG. 6 is an example of a flowchart in a case where an error occurs as the result of use of read information in the embodiment of the invention.

FIG. 6 is an example of a flowchart in a case where the error occurs as the result of use of the read information.

In step S30, the controller 20 determines whether or not the read-required information Ds read from the storage device 10 is read using the read method having relatively high safety of the data assurance. In a case where the read-required information Ds is read using the read method having relatively high safety of the data assurance (e.g., the three majority rule or the mirroring) (Yes in step S30), the controller 20 executes the subsequent processing by using a value obtained by actually applying the read-required information Ds to predetermined processing (step S32).

On the other hand, in a case where the read-required information Ds is read using the read method having relatively low safety of the data assurance (e.g., the sum check or the read method without data assurance) (No in step S30), the controller 20 executes the processing in step S34. In step S34, the controller 20 determines whether or not the error is present in the value obtained by actually applying the read-required information Ds read using the read method having relatively low safety of the data assurance to the predetermined processing (step S34).

When the controller 20 determines that the error is not present, the controller 20 executes the subsequent processing by using the read-required information Ds read using the read method having relatively low safety of the data assurance (step S32). On the other hand, when the controller 20 determines that the error is present, the controller 20 prohibits the use of the read-required information Ds read using the read method having relatively low safety of the data assurance, and executes the subsequent processing by using an estimated value estimated using a predetermined method (step S36).

Figure 7:
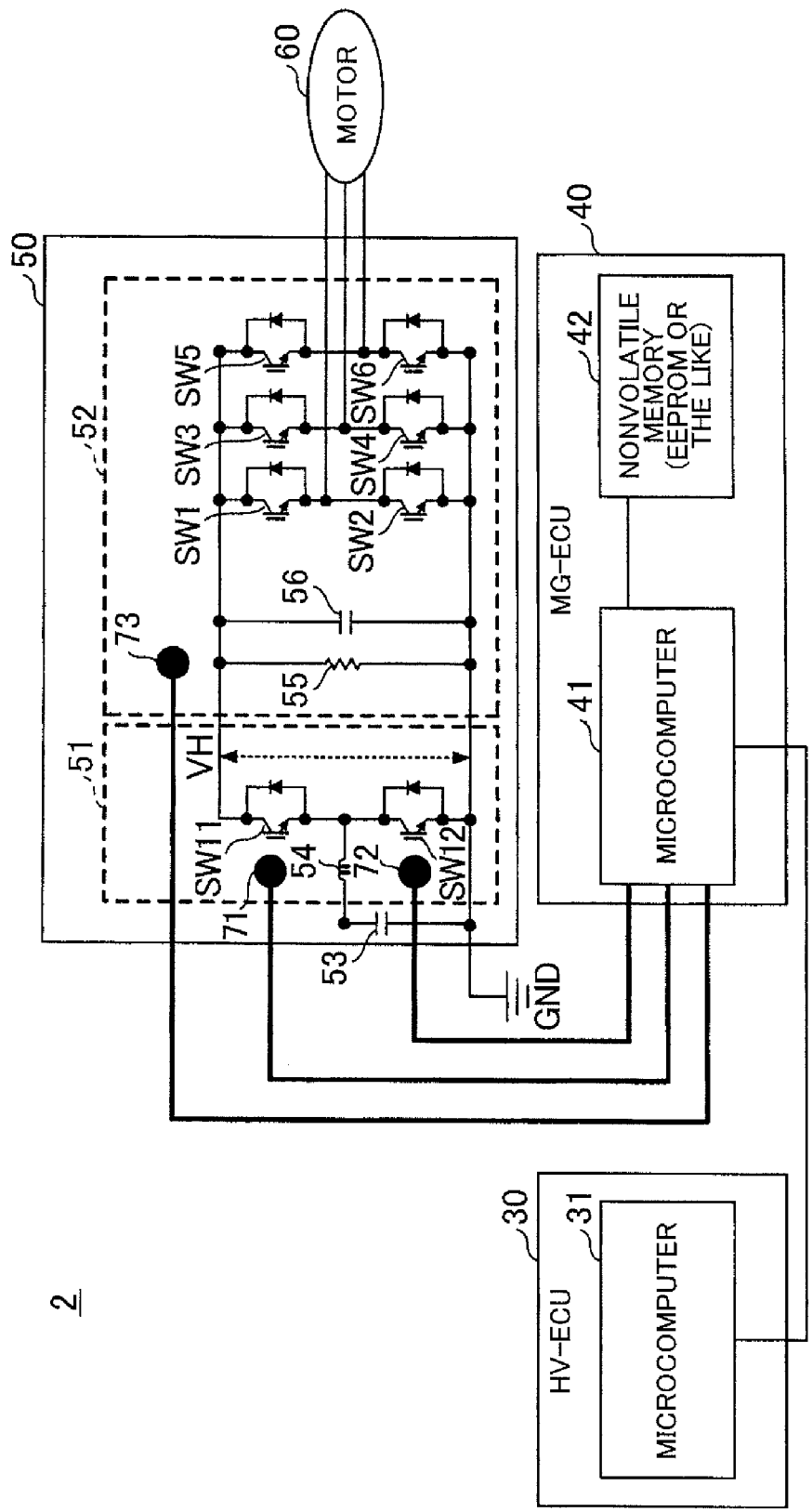
FIG. 7 is a block diagram showing an example of a motor control system in the embodiment of the invention.

Next, a specific example of application of the information processing device 1 will be described. FIG. 7 is a configurational view of a motor control system 2 in a vehicle having an electric motor as a running drive source such as what is called a hybrid vehicle or the like. The motor control system 2 includes a hybrid vehicle electronic control unit (HV-ECU) 30, a motor generator electronic control unit (MG-ECU) 40, an intelligent power module (IPM) 50, and a motor 60. The motor 60 generates a driving force for causing the vehicle to run. The ECU is an electronic control unit (the specific example of the information processing device 1) including a microcomputer provided with a CPU.

The IPM 50 is a drive device for the motor 60, and performs a fallback operation according to the temperature detected by each of temperature sensors 71, 72, and 73. The MG-ECU 40 monitors the temperature of each of a step-up converter 51 and an inverter 52 of the IPM 50 using the temperature sensors 71, 72, and 73, and executes the fallback control of the IPM 50 for the purpose of protecting components in a case where the monitored temperature is higher than a predetermined value. The fallback control means a control in which the value of a current flowing to the inverter 52 is suppressed in order to reduce the temperature of each of the step-up converter 51 and the inverter 52 and a user-requested torque cannot be achieved completely as the result of the reduction. Since temperature elements used in the fallback control (transistors SW11 and SW12 of the step-up converter 51 and transistors SW1 to SW6 of the inverter 52) have variations in characteristics, correction values of the temperature elements are pre-stored in the EEPROM 42, and are used in the fallback control. With this, it is possible to implement an improvement in controllability and a reduction in cost by alleviating variations among the elements.

The temperature sensor 71 is a unit for detecting the temperature of the high-side transistor SW11 of the step-up converter 51, and the temperature sensor 72 is a unit for detecting the temperature of the low-side transistor SW12 of the step-up converter 51. The temperature sensor 73 is a unit for detecting the temperature of the high-side transistor SW1 of the inverter 52. The MG-ECU 40 has a substrate on which a microcomputer 41 that detects a voltage corresponding to each of the temperatures detected by the temperature sensors 71, 72, and 73 and the EEPROM 42 that stores the correction value used in the correction of the temperature element are mounted. The HV-ECU 30 determines permission or prohibition of the switching operation of each of the transistors SW1 to SW6 constituting a three-phase bridge circuit in the inverter 52.

Figure 8:
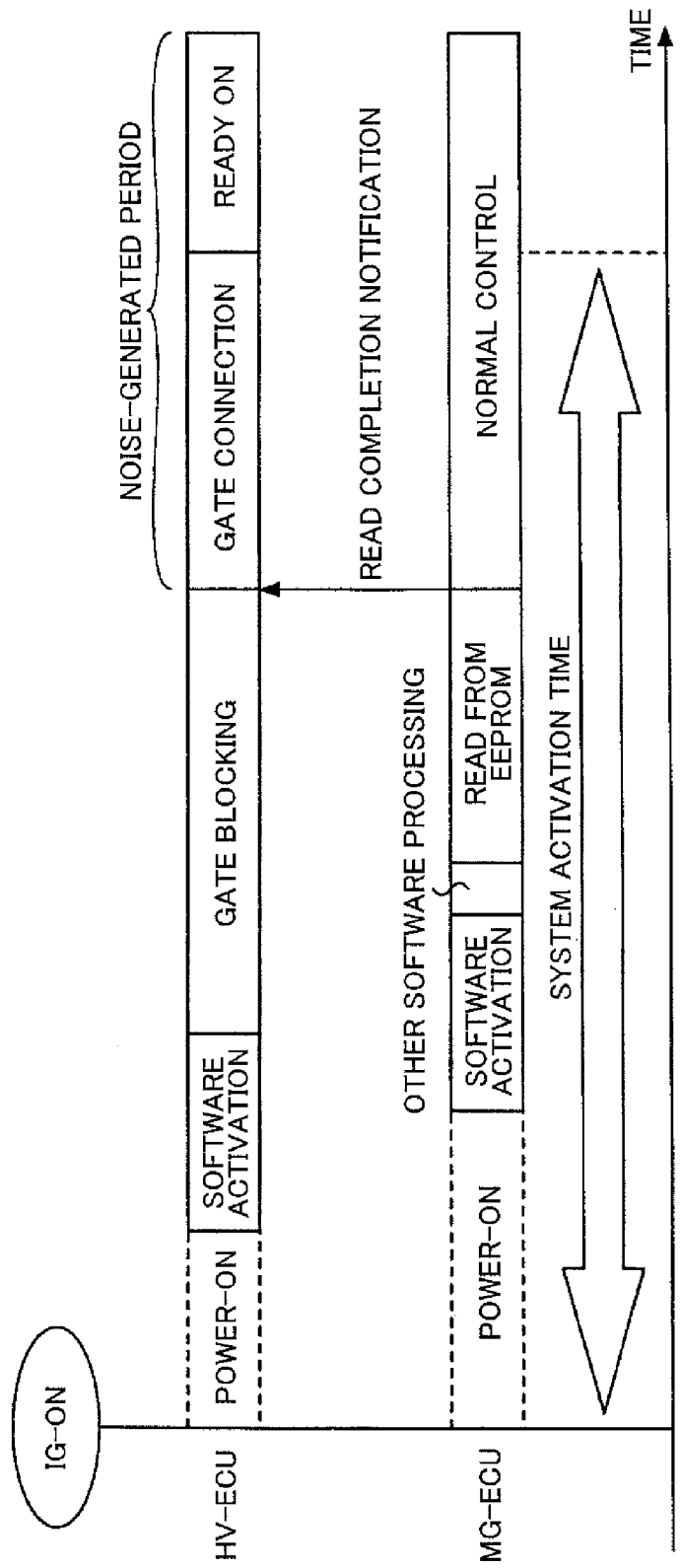
FIG. 8 shows an example of a sequence of read of a correction value in the embodiment of the invention.

FIG. 8 shows an example of a sequence of the read of the correction value from the EEPROM 42. An ignition switch is turned ON, and the HV-ECU 30 and the MG-ECU 40 are thereby energized and activated. Subsequently, a microcomputer 31 of the HV-ECU 30 and the microcomputer 41 of the MG-ECU 40 start predetermined software processing.

The microcomputer 31 of the HV-ECU 30 blocks the gate drive of each transistor of the inverter 52 and the step-up converter 51 until the microcomputer 31 receives a read completion notification from the MG-ECU 40. On the other hand, the microcomputer 41 of the MG-ECU 40 starts the read of the data from the EEPROM 42 after other software processing such as interruption processing and the like and, when the read is completed, the microcomputer 41 transmits the read completion notification to the HV-ECU 30.

When receiving the read completion notification, the microcomputer 31 of the HV-ECU 30 outputs a permission signal that permits the gate drive of each transistor of the inverter 52 and the step-up converter 51, and sets the mode of the motor control system 2 to READY ON. The microcomputer 41 of the MG-ECU 40 having received the permission signal actually performs the gate drive of each transistor of the inverter 52 and the step-up converter 51.

However, it is necessary to be able to read the correction value from the EEPROM 42 at the time of the system activation when there is no influence of noises caused by switching of the step-up converter 51 or the inverter 52. Accordingly, the read should be completed within the restricted activation time of the entire system (from IGNITION ON to READY ON). Further, in a case where the read of data other than the correction value is required or a case where other software processing needs to be executed, the permitted read time sometimes varies and is further reduced. In the motor control system 2, the read of all data items must be reliably completed within the restricted time.

Figure 9:
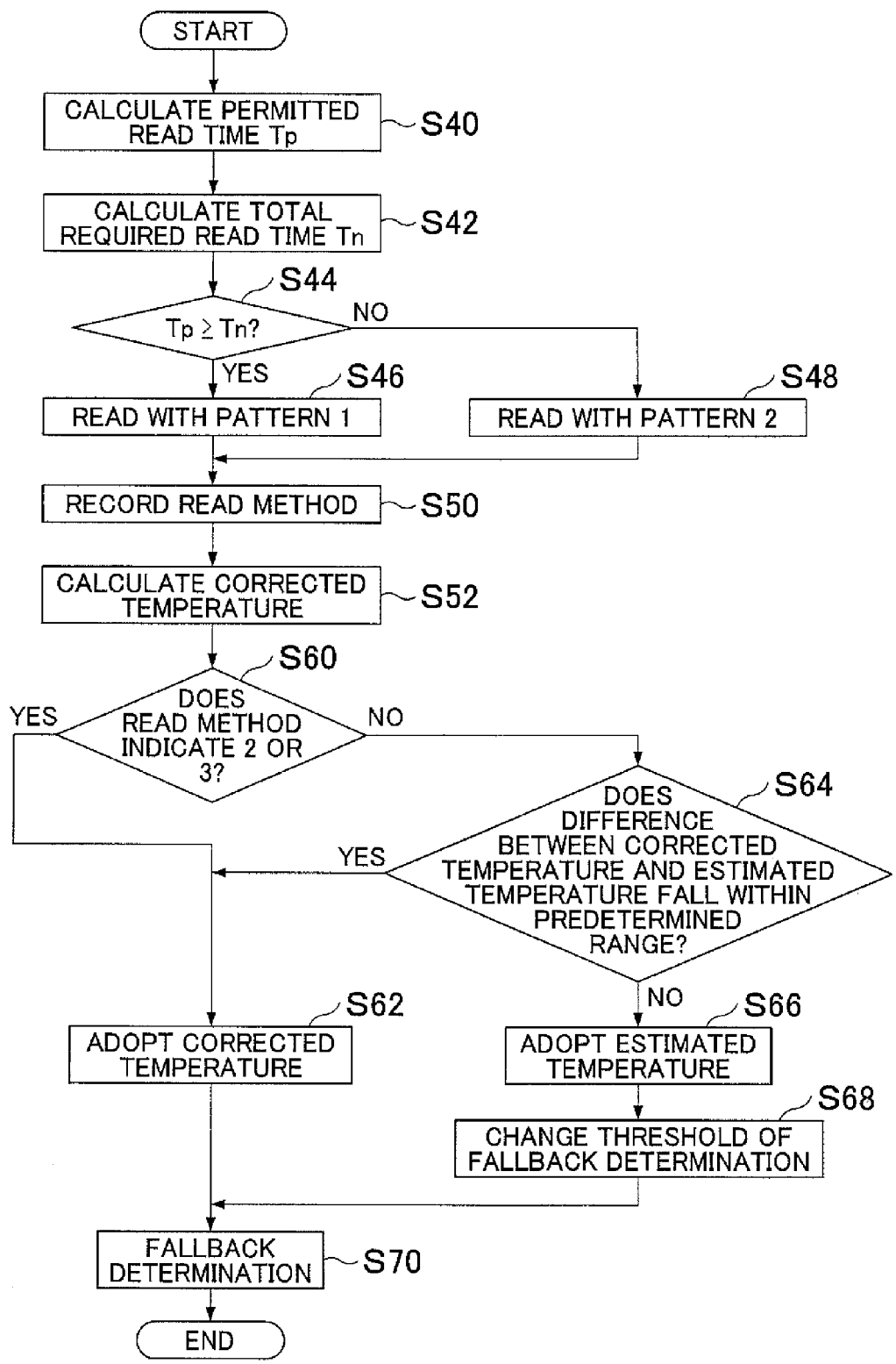
FIG. 9 is an example of a data read flow in the motor control system in the embodiment of the invention.

FIG. 9 is an example of a data read flow in the motor control system 2.

First, in step S40, the microcomputer 41 of the MG-ECU 40 calculates the permitted read time Tp in advance at the time of the data read from the EEPROM 42. When it is assumed that a total permitted time permitted as the motor control system 2 is T1, a time elapsed until the software activation is T2, and a software processing time other than the read is T3, the permitted read time Tp is calculated according to Tp=T1−T2−T3.

Herein, the total permitted time T1 is a numerical value that can be uniquely determined based on the design of the motor control system 2. The time elapsed until the software activation T2 is a numerical value that can be uniquely determined based on the power source circuit or the microcomputer design of each ECU. The software processing time T3 is a numerical value that changes according to the configuration of the motor control system 2, and is determined by the read of the system configuration from an internal memory or an external memory at the time of the software activation.

In step S42, the microcomputer 41 of the MG-ECU 40 calculates the total required read time In of the information to be read from the EEPROM 42. The total required read time Tn is a value obtained by dividing a total data amount Dt of the information to be read (unit: bit) by a predetermined read speed V (unit: bit/second).

The total data amount Dt is determined by reading the presence or absence of a previous abnormality from the internal memory or the external memory at the time of the software activation. Thus, the total permitted time T1, the software processing time T3, and the total data amount Dt are values that change according to the configuration or the situation of the system, and hence the comparison result in step S44 dynamically changes.

In step S44, the microcomputer 41 of the MG-ECU 40 compares the total required read time Tn with the permitted read time Tp. In a case where the permitted read time Tp is not less than the total required read time Tn, the microcomputer 41 reads the read-required information Ds using the read method of Pattern 1 of FIG. 3 (step S46). On the other hand, in a case where the permitted read time Tp is less than the total required read time Tn, the microcomputer 41 reads the read-required information Ds using the read method of Pattern 2 of FIG. 3 (step S48).

Thus, even in the case where the total required read time Tn is more than the permitted read time Tp, it is possible to read data with high importance using the assurance method having high safety to reliably perform necessary and sufficient component protection within the entire restriction time by the use of data read method of Pattern 2.

In addition, in a case where data read by simplifying the read method includes the correction value of the temperature element, there is a possibility that the component cannot be sufficiently protected, and it is necessary to prevent the insufficient component protection. Accordingly, the microcomputer 41 switches between use and non-use of the read correction value according to the adopted read method.

For example, the microcomputer 41 records the record method for each read data in a memory such as the RAM or the like when the microcomputer 41 reads the data from the EEPROM 42 (step S50). For example, in a case where the data is read using the three majority rule, the microcomputer 41 records "3" corresponding number to the three majority rule. In a case where the data is read using the mirroring, the microcomputer 41 records "2" corresponding number to the mirroring. In a case where the data is read using the sum check, the microcomputer 41 records "1" corresponding number to the sum check. In a case where the data is read without the data assurance, the microcomputer 41 records "0" corresponding number to the read method without the data assurance.

In step S52, the microcomputer 41 calculates a temperature (a corrected temperature) obtained by correcting a detected temperature obtained by each of the temperature sensors 71, 72, and 73 by using the correction value read from the EEPROM 42.

In step S60, the microcomputer 41 determines which read method is used to read the correction value read from the EEPROM 42 based on the record information in step S50. In a case where the correction value is read using the read method having relatively high safety of the data assurance, i.e., the read method recorded in the memory indicates 2 or 3 (e.g., the three majority rule or the mirroring) (Yes in step S60), the microcomputer 41 adopts the corrected temperature calculated in step S52 in the subsequent arithmetic processing (step S62).

On the other hand, in a case where it is recorded that the correction value is read using the read method having low safety of the data assurance, i.e., in a case where the read method recorded in the memory indicates 0 or 1 (No in step S60), the reliability of the corrected temperature calculated by using the correction value in step S52 is considered to be low. Accordingly, in step S64, the microcomputer 41 compares the corrected temperature calculated in step S52 with a temperature estimated from temperatures at other locations (an estimated temperature).

For example, in the case of the estimated temperature of the transistor of the step-up converter 51, by utilizing the point that the temperature of the high-side transistor SW11 is lower than that of the low-side transistor SW12 by 10° C., based on the detected temperature by one of the temperature sensors, it is possible to estimate the detected temperature by the other temperature sensor. In addition, the estimated temperature of the transistor of the inverter 52 may be estimated based on that the temperature of the transistor of the inverter 52 is equal to the temperature of the cooling water of the inverter 52. Thus, even by using the temperatures at other locations, it is possible to determine the estimated temperature from the installation position and thermal design.

In step S64, the microcomputer 41 determines whether or not the difference between the corrected temperature calculated in step S52 and the estimated temperature falls within a predetermined appropriate range (e.g., ±5° C.). In a case where the difference therebetween falls within the appropriate range, the microcomputer 41 adopts the corrected temperature calculated in step S52 in the subsequent arithmetic processing (step S62). On the other hand, in a case where the difference therebetween does not fall within the appropriate range, the microcomputer 41 determines that the reliability of the corrected temperature calculated in step S52 is low, and adopts the estimated temperature in the subsequent arithmetic processing (step S66).

In the case where the estimated temperature mentioned above is adopted, the accuracy of the temperature is not high, and hence the temperature of the threshold of fallback operation determination may be lowered (step S68). With this, even when the accuracy of the estimated temperature is low, it is possible to perform the fallback operation safely. As a result, it is possible to implement reliable component protection. In addition, it is possible to alleviate the temperature compensation range of the IPM 50, and hence it is possible to reduce the size and cost of the entire IPM 50.

In step S70, in a case where the temperature adopted in step S62 or S66 is higher than the threshold of the fallback operation determination, the microcomputer 41 executes the fallback control.

Although the information processing device, the information processing method, and the control system have been described thus far by using the embodiment, the invention is not limited to the embodiment described above. Various modifications and improvements such as a combination with a part or the whole of another embodiment or a substitution therewith can be made within the scope of the invention.

For example, although the temperature is used as the physical quantity to be corrected in the embodiment described above, the invention can also be applied to a case where the physical quantity other than the temperature (e.g., pressure, voltage, current, distortion, speed, revolution per minute (RPM), or the like) is corrected. In addition, the correction value stored in the storage device such as the EEPROM or the like may also be origin information of a resolver for detecting the RPM.

What is claimed is:

1. An information processing device, comprising:
    a storage device that stores information; and
    a controller including a plurality of read methods, the controller being configured to adjust a consumption rate (information to be read per unit data amount) at which information is read from the storage device based on: (i) a priority of the information to be read from the storage device, and (ii) a permitted read time during which the controller is permitted to read information from the storage device, wherein:
    the permitted read time varies, and
    in a case where a length of the permitted read time is short, the controller switches from a first read method that reads information with a higher safety rating to a second read method that reads information with a lower safety rating.

2. The information processing device according to claim 1, wherein the controller adjusts the consumption rate of read time according to the priority such that all of the information is read from the storage device within the permitted read time.

3. The information processing device according to claim 1, wherein the controller reduces the consumption rate of read time of reading information having a lower priority than other information.

4. The information processing device according to claim 3, wherein, in a case where the information having a lower priority, which has been read with the reduced consumption rate of read time, includes an error, the controller causes information different from the information having a lower priority to be reflected in subsequent processing.

5. The information processing device according to claim 4, wherein the different information is information estimated without using the information having an error.

6. The information processing device according to claim 1, wherein the controller executes adjustment of the consumption rate of read time when a total required read time that is required to read all of the information to be read exceeds the permitted read time.

7. An information processing device, comprising:
    a storage device that stores information; and
    a controller including a plurality of read methods, the controller being configured to read information in the storage device via one of the plurality of read methods corresponding to a priority of the information such that all of the information to be read from the storage device is read within a permitted read time during which the controller is permitted to read information from the storage device, wherein:

the permitted read time varies, and in a case where a length of the permitted read time is short, the controller switches from a first reads information with a higher safety rating to a second read method that reads information with a lower safety rating.

8. A control system, comprising:
the information processing device according to claim 7;
a detection device that detects a predetermined physical quantity; and
a control device that operates according to the physical quantity detected by the detection device,
wherein the storage device stores a correction value used for correction of the physical quantity detected by the detection device.

9. An information processing method executed by an information processing device connected to a storage device, the information processing method comprising:
selecting one of a plurality of reading methods to read information from the storage device;
calculating a permitted read time during which the information processing device is permitted to read information from the storage device; and
adjusting a consumption rate (information to be read per unit data amount) based on: (i) a priority of the information to be read from the storage device, and (ii) the permitted read time, wherein:
in a case where a length of the permitted read time is short, a first read method that reads information with a higher safety rating is switched to a second read method that reads information with a lower safety rating.

10. The information processing method according to claim 9, further comprising:
reading the information to be read using a read method corresponding to the priority such that all of the information to be read from the storage device is read within the permitted read time.

11. A control system, comprising:
the information processing device according to claim 1;
a detection device that detects a predetermined physical quantity; and
a control device that operates according to the physical quantity detected by the detection device,
wherein the storage device stores a correction value used for correction of the physical quantity detected by the detection device.

12. The information processing device according to claim 1, wherein the plurality of read methods includes: three majority rule, mirroring, sum check and no data assurance.

13. The information processing device according to claim 7, wherein the plurality of read methods includes: three majority rule, mirroring, sum check and no data assurance.

14. The information processing method according to claim 9, wherein the plurality of read methods includes: three majority rule, mirroring, sum check and no data assurance.

15. The information processing device according to claim 1, wherein
the first read method corresponds to three majority rule, mirroring and sum check, and
the second read method corresponds to mirroring, sum check and no data assurance.

16. The information processing device according to claim 7, wherein
the first read method corresponds to three majority rule, mirroring and sum check, and
the second read method corresponds to mirroring, sum check and no data assurance.

17. The information processing method according to claim 9, wherein
the first read method corresponds to three majority rule, mirroring and sum check, and
the second read method corresponds to mirroring, sum check and no data assurance.

\* \* \* \* \*